(12) United States Patent
Luncz

(10) Patent No.: US 6,749,046 B2
(45) Date of Patent: Jun. 15, 2004

(54) COMBINED SPRING AND SHOCK ABSORBER SYSTEM INCLUDING A HYDRAULIC ACCUMULATOR

(75) Inventor: Helmut Luncz, Korntal-Münchingen (DE)

(73) Assignee: DaimlerChrysler AG., Stuttgart (DE)

( * ) Notice: Subject to any disclaimer, the term of this patent is extended or adjusted under 35 U.S.C. 154(b) by 0 days.

(21) Appl. No.: 10/325,489

(22) Filed: Dec. 20, 2002

(65) Prior Publication Data

US 2003/0116895 A1 Jun. 26, 2003

(30) Foreign Application Priority Data

Dec. 22, 2001 (DE) .......................... 101 63 895

(51) Int. Cl.⁷ ................................. F16F 9/00
(52) U.S. Cl. ...................... 188/314; 188/297; 188/298; 188/318; 188/322.21
(58) Field of Search ................. 188/297, 298, 188/314, 318, 322.21; 267/122, 123, 64.28, 64.21, 64.24, 64.19; 138/30

(56) References Cited

U.S. PATENT DOCUMENTS

| 3,222,047 A | * | 12/1965 | Tuczek | 267/64.19 |
| 3,625,242 A | * | 12/1971 | Ostwald | 138/30 |
| 3,744,527 A | * | 7/1973 | Mercier | 138/30 |
| 4,655,440 A | * | 4/1987 | Eckert | 188/314 |
| 4,921,080 A | * | 5/1990 | Lin | 188/314 |
| 5,219,152 A | * | 6/1993 | Derrien et al. | 267/64.15 |

FOREIGN PATENT DOCUMENTS

| DE | 0 351 537 A2 | * | 1/1990 | 188/285 |
| DE | WO 01/14765 A1 | * | 3/2001 | |
| DE | 100 24 571 | | 11/2001 | |

* cited by examiner

Primary Examiner—Jack Lavinder
Assistant Examiner—Mariano Sy
(74) Attorney, Agent, or Firm—Klaus J. Bach

(57) ABSTRACT

In a combined spring and shock absorber system for a wheel suspension of a vehicle comprising tubular rolling bellows arranged between a wheel-support structure and a vehicle body the bellows includes a space filled with a fluid in communication with a hydraulic accumulator. The bellows space is also in communication with at least one additional hydraulic accumulator via a throttle passage and via at least one pre-set differential pressure-control valve ensuring that threshold values for the internal pressure in the tubular rolling bellows are not exceeded in the event of high spring-extension and/or spring-compression speeds.

6 Claims, 2 Drawing Sheets

COMBINED SPRING AND SHOCK ABSORBER SYSTEM INCLUDING A HYDRAULIC ACCUMULATOR

BACKGROUND OF THE INVENTION

The invention relates to a combined spring and shock absorber system for wheel suspensions or for axles of a vehicle using tubular rolling bellows arranged between a wheel-supporting or wheel-guide structure and a vehicle-body or vehicle body support structure, wherein the bellows space is filled with a fluid and communicates with a hydraulic accumulator.

When, in a hydraulic spring and shock absorber system, the suspension of a wheel is compressed, hydraulic fluid is displaced from the bellows space into the hydraulic accumulator through a throttle passage. In the process, a gas cushion is compressed in the hydraulic accumulator. As a result a counter-force is built up, which pushes the hydraulic fluid back out of the hydraulic accumulator through a throttle passage and into the bellows space.

When the suspension on one wheel is extended, the volume of the bellows space is increased. The pressure in the bellows space decreases. Due to the drop in pressure the hydraulic accumulator now causes hydraulic fluid to flow into the bellows space in a throttled fashion.

DE 100 24 571 discloses such a spring damping system. At high spring-extension speeds the internal pressure of the bellows space can decrease in an unacceptable fashion. At high spring-compression speeds there is a risk that the pressure in the bellows space will exceed a permissible upper limit.

It is the object of the present invention to provide a spring and shock absorber system in which the fluid pressure will not exceed any permissible limit value under high spring-extension and/or spring-compression speeds and wherein the operation of the spring and shock absorbing system is impaired as little as possible.

SUMMARY OF THE INVENTION

In a combined spring and shock absorber system for a wheel suspension of a vehicle comprising tubular rolling bellows arranged between a wheel-support structure and a vehicle body the bellows includes a space filled with a fluid in communication with a hydraulic accumulator. The bellows space is also in communication with at least one additional hydraulic accumulator via a throttle passage and via at least one pre-set differential pressure-control valve ensuring that threshold values for the internal pressure in the tubular rolling bellows are not exceeded in the event of high spring-extension and/or spring-compression speeds.

The additional hydraulic accumulator is arranged in parallel with the main hydraulic accumulator and also communicates with the bellows space through a throttle passage. It additionally includes the differential pressure-controlled valve. When the difference between the pressure in the bellows space and a pre-set pressure as determined for example by a spring exceeds a threshold value, the differential pressure-controlled valve opens. The threshold value is pre-set between an upper and a lower limiting value, for example a tubular rolling bellows-specific value. Hydraulic fluid now flows for example from the hydraulic accumulator into the bellows space, in order to counter a loss of volume during fast extension of the suspension. The hydraulic fluid is now conveyed rapidly and without throttling to the bellows space. As soon as the pre-set pressure difference is reached again, the differential-pressure-controlled valve closes again. This ensures that the internal pressure of the spring damping system remains within permissible pressure limits.

In order to avoid an overpressure and an under-pressure in the bellows space, it is possible, for example, to use two differential pressure-controlled valves on one hydraulic accumulator. One of these valves then opens when the pressure in the bellows space drops below a lower threshold value, the other when an upper threshold value is exceeded. These differential-pressure-controlled valves can also be combined with each other. It is also conceivable to use two separate hydraulic accumulators for these two tasks.

If the additional hydraulic accumulators fail, for example due to a leak, they can be switched off. The damping function of the spring damping system of the vehicle remains fully intact in the process.

The invention will become more readily apparent from the following description of embodiments thereof described below with reference to the accompanying drawings.

BRIEF DESCRIPTION OF THE DRAIWNGS

DESCRIPTION OF PREFERRED EMBODIMENTS

Figure 1:
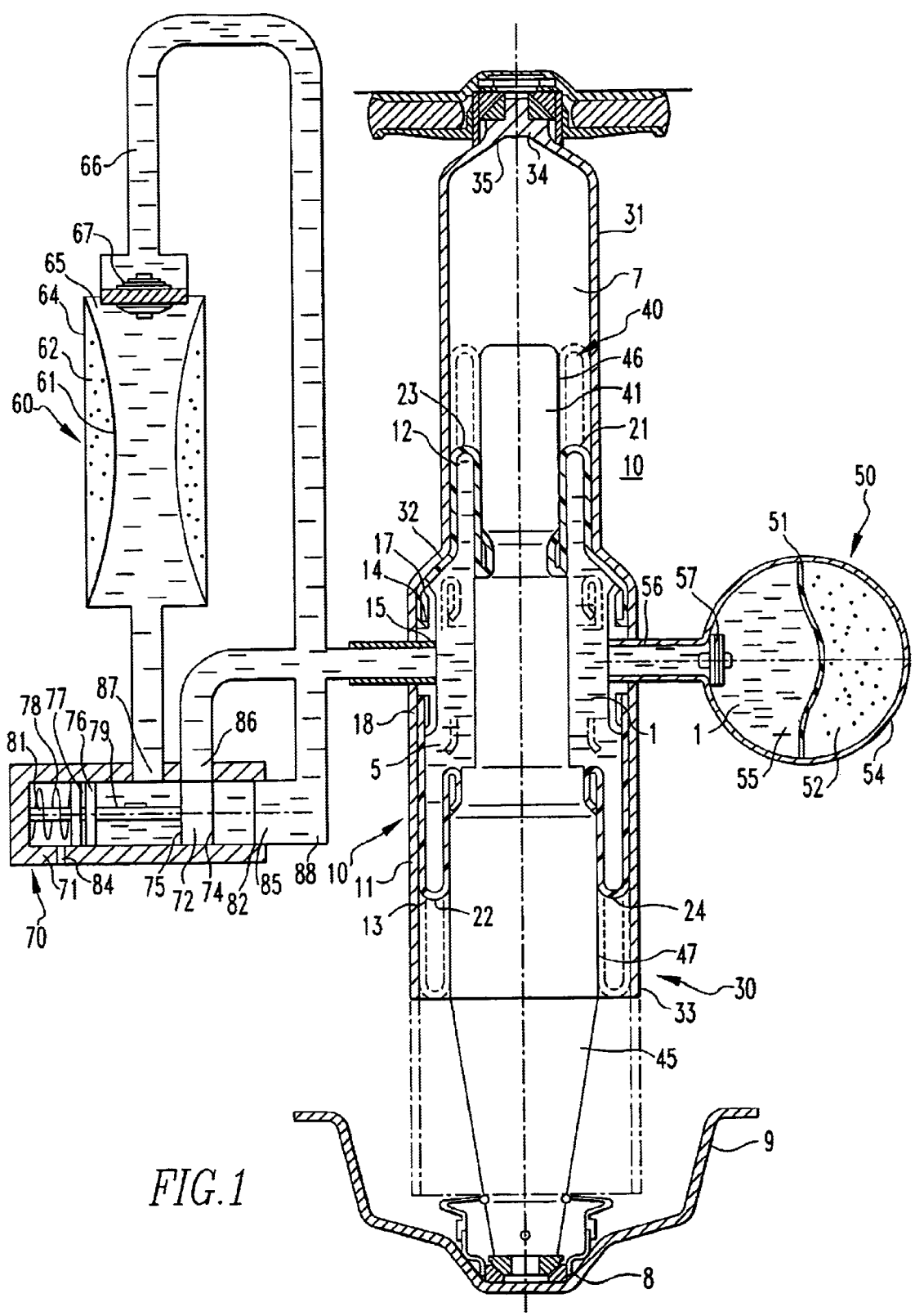
FIG. 1 shows a combined spring and shock absorber or damping system having differential rolling bellows and two external hydraulic accumulators.

FIG. 1 shows a combined spring and shock absorber system, comprising one displacer (10), two hydraulic accumulators (50, 60) and two hydraulic lines (56, 66) having integrated throttle valves (57, 67), with fluid lines (56, 66) being arranged between the hydraulic accumulators (50, 60) for carrying operating fluid.

The displacer (10) comprises, inter alia, as components an outer bell (30) having a plurality of stages, a guide piston (40) also having a plurality of stages and differential rolling bellows (11) comprising a plurality of parts and connecting both of the components. Under spring compression and extension, the guide piston (40) moves up and down, the latter being for example fastened to the wheel support and guided and centered by the differential rolling bellows (11). In the process, the outer wall (23, 24) of the differential rolling bellows (11) rolls along the outer bell (30) and along the guide piston (40).

The outer bell (30) is a hollow body, comprising at least partially cylindrical sections (31, 33), which are connected to each other by means of a transition section (32) in the shape of a frustrum. In FIG. 1 the sections (31, 33) and the transition section (32) are, for example, fabricated as an integral structure. The upper section (31) is closed off at its upper end by means of an end wall (34). An adapter (35) is integrally formed with the end wall (34) to permit articulated attachment to the vehicle body. The inner diameter of the upper, cylindrical section (31) is, for example, two thirds of the inner diameter of the lower, cylindrical section (33).

The sections (31) and (33) can also have an inner contour in the shape of a frustrum, a curved or a differently shaped inner contour. In such a case the upper section (31) would, for example, taper towards the top and the lower section (33) would taper towards the bottom.

The guide piston (40) also has an upper guide section (41) and a lower guide section (45), the sections (41, 45) having, for example, a cylindrical outer contour (46, 47). The outer diameter of the upper section (41) is smaller than the outer diameter of the lower guide section (45). The outer diameter of the upper section (41) is, for example, 60% of the inner diameter of the outer bell section (31). The difference in diameters has been chosen in the exemplary embodiment in such a way that in each case the gaps between the sections (31) and (41) which are opposite one another have approximately the same width in the zones in which the diaphragms (21, 22) of the differential rolling bellows (11) move.

In FIG. 1 the lower section (45) of the guide piston (40) is tapered downwardly. The tapering starts below the area with which the differential rolling bellows (11) can come into contact. The lower end of the guide piston (40) ends in an adapter (8) to permit articulated attachment to the wheel support (9).

The differential rolling bellows (11) arranged between the guide piston (40) and the outer bell (30) comprises two tubular rolling bellows halves (12, 13) which may be identical. The rolling bellows halves (12, 13) are aligned coaxially wfth respect to each other and are attached to each other by means of an almost pipe-shaped coupling sleeve (14) in a gas-tight and fluid-tight arrangement. The coupling sleeve (14) is a short pipe, onto which one rolling bellows half (12, 13) is mounted from each side. The particular mounted-on section of the corresponding rolling bellows half (12, 13) is fixed to the coupling sleeve (14) in a non-slipping manner with the aid of a clamping ring (17, 18) so that the parts are frictionally and positively locked. At their other ends, the rolling bellows are connected by clamping rings 48, 49. In FIG. 1 the coupling sleeve has a pipe section (15) between the clamping rings (17, 18). This pipe section (15) is not covered by the rolling bellows halves (12, 13). It has an outer diameter which is only slightly smaller than the inner diameter of the lower section (33) of the outer bell (30).

The space (5) enclosed by the differential rolling bellows (11) is filled with an incompressible fluid (1) which is pressurized according to FIG. 1 by means of a gas cushion enclosed in a hydraulic accumulator (50). The hydraulic accumulator (50) is, for example, formed as a spherical or diaphragm reservoir. The gas cushion (52) being separated from the fluid chamber (55) in the sphere (54) by a diaphragm (51) forms the spring means for the spring and shock absorber or damping system.

The hydraulic accumulator (50), which is illustrated next to the outer bell (30) only by way of example, is connected to the bellows space (5) by means of a fluid line (56). To this end, the line (56) is routed through the outer bell section (33) and is connected to the coupling sleeve (14). By this means, the line (56) itself retains the coupling sleeve (14) in the outer bell section (33) in a positively locking fashion.

In the housing (54) of the hydraulic accumulator (50) there are two proportioning pressure relief valves at the transition to the fluid line (56) in the form of diaphragm valves (57). The proportioning pressure relief valves operate in opposite directions. Each valve (57) opens in one of the two flow directions. The throttling effect of the single one-way throttle valve (57) can be made adjustable if appropriate by means of an open or closed-loop actuation system.

At the coupling sleeve (14) the second fluid line (66) is connected through the outer bell section (33) to the bellows space (5). The bellows space (5) is in communication with the second hydraulic accumulator (60) by means of this line (66). Two proportioning pressure relief valves in the form of diaphragm valves (57) are arranged in the line (66), which valves operate in opposite directions. Here as well the throttling effect of the single one-way throttle valve (67) can, if appropriate, be made adjustable by means of an open or closed-loop actuation system.

The hydraulic accumulator (60) is shown in the form of a tubular reservoir. Its housing (64) is, for example, cylindrical and has in its interior a tubular membrane (61), which separates a gas cushion (62) from a fluid space (65). The pre-loaded gas cushion (62) encloses the fluid space (65). Of course, the gas cushion (62) and the fluid space (65) can also be arranged in a reversed arrangement with respect to each other. The gas cushion (62) can, for example, also have an outward connection, by means of which connection the pre-load pressure of the gas is adjustable.

A communication line (88), which connects the fluid line (66) to a differential pressure-controlled valve (70), for example a pressure balance, branches off from the fluid line (66). The pressure balance (70) comprises for example a cylinder (71), the latter having a spring-loaded dual piston (72, 76). The piston (76) illustrated on the left in FIG. 1 is a sealing piston and the piston (72) illustrated on the right is a control piston. An adjustable, spring (78) is supported between the sealing piston (76) and an end face of the cylinder (71).

The cylinder (71) has four connections (84–87). The connection (84) is arranged in the area of the spring (78) and connects this area for example to the atmosphere surrounding the spring damping system.

The connection (85) is at the front face of the cylinder (71) opposite the spring (78). By means of this connection (85) the piston surface (74) of the control piston (72) has a direct hydraulic connection to the bellows space (5).

A further connection (86) of the cylinder (71) provides for communication of the latter with the bellows space (5). In the piston position according to FIG. 1, this connection (86) is closed off by the control piston (72).

The fourth connection (87) of the cylinder (71) is arranged between the two pistons (72, 76). The hydraulic accumulator (60) is connected to this connection (87).

The two pistons (72, 76) are connected to each other by means of a piston rod (79). The distance between them corresponds approximately to the sum of the diameters of the two connections (86) and (87). The sealing piston (76) forms a seal between the space between the pistons (72, 76) and the area of the spring (78). For this purpose, the sealing piston (76) has a sealing element (77) disposed in an annular groove of the piston (76).

The cylindrical control piston (72) has a control edge on its rod side (75). Its length required to block the connection (86) is greater than the diameter of the connection (86). The surface area of the rod side (75) of the piston (72) is smaller than the outward-orientated piston surface (74) by an amount corresponding to the cross-sectional area of the piston rod (79). The control piston (72) separates the intermediate space between the pistons (72, 76) from the area of the cylinder (71), which is connected to the connection (85).

The travel of the pistons (72, 76) in the cylinder (71) is limited at the control piston (72) end by a cir-clip (82). The latter is arranged in such a way that when the control piston (72) comes to bear on the circlip the connections (86, 87) are not blocked. At the sealing piston (76) end, the travel of the pistons is limited for example by a stop rod (81). In the illustrated stop position, at least the connection (86) is closed off by the control piston (72).

The fluid space (65) of the hydraulic accumulator (60) is also filled with hydraulic fluid. The gas cushions (52, 62) of the hydraulic accumulators (50, 60) are, for example, preloaded in such a way that the pressure in the hydraulic accumulator (50) is higher than in the hydraulic accumulator (60). Both pressures are generally higher than normal atmospheric pressure.

During operation of the vehicle both hydraulic accumulators (50, 60) function as parallel-connected springs and dampers. The hydraulic fluid flows under compression by a wheel support structure from the bellows space (5) through the throttle passages (57, 67) into the two hydraulic accumulators (50, 60). The gas in the particular gas cushion (52, 62) is compressed, in the process building up a counter-force, which drives the hydraulic fluid back out of the hydraulic accumulators (50, 60) into the bellows space (5) in a throttled fashion.

At the pressure balance (70) the pressure from the bellows space (5) is present at the outer piston surface (74) of the piston (72). The force exerted on this piston surface (74) is in equilibrium with the force of the spring (78) and the atmosphere on the sealing piston (76). In the process the control piston (72) is moved back and closes off the connection (86) of the cylinder (71). The pistons are then in the end position shown at the left in FIG. 1.

At the rolling bellows (11), the forces generated as a result of the internal pressure in the bellows space (5) are in equilibrium with the forces acting as a result of the atmospheric pressure and the particular wheel load.

If the load on a wheel is abruptly removed, for example when the vehicle drives over a deep pothole, the wheel pulls the rolling bellows (11) outwards at high speed. As a result, the volume enclosed by the rolling bellows (11) is abruptly increased.

Due to the increase in volume the pressure of the fluid in the rolling bellows (11) is decreased. The rolling bellows (11) is compressed by the force of atmospheric pressure. Hydraulic fluid flows out from the hydraulic accumulators (50, 60) into the bellows space through the throttle passages (57, 67).

At the same time, the force on the outer piston surface (74) of the control piston (72) decreases. The force of the spring (78) pushes the pistons (72, 76) against the circlip (82). In the process, the connection (86) on the cylinder (71) is opened. Now hydraulic fluid flows in throttled from the hydraulic accumulator (60) from the connection (87) through the inner space of the cylinder (71) and via the connection (86) into the bellows space (5). The volume of hydraulic fluid in the bellows space (5) increases. The pressure in the bellows space (5) also increases. As the pressure increases, the force exerted by the hydraulic fluid on the piston surface (74) of the control piston (72) also increases. If this force is greater than the forces exerted on the piston by the spring (78) and the atmospheric pressure, the pistons (72, 76) are pushed back towards the left, and the connection (86) is blocked, see FIG. 1. In the subsequent normal processes of spring compression and extension, a further exchange of volumes takes place between the bellows space (5) and the hydraulic accumulators (50, 60). At the same time, the hydraulic accumulator (60) is also filled again.

In the pressure balance (70) the connections (86) and (87) can also be simultaneously blocked by the outer surface of the control piston (72). As a result, if appropriate, the controlling effect of the control piston (72), which then acts on the inward flow and the outward flow of the cylinder (71), can be increased.

The spring (78) may be formed, for example, by an enclosed gas space with an adjustable gas pressure. In this way, depending on the driving situation, a smaller or greater pressure difference can be set for actuating the pressure balance (70).

The pressure of the gas cushion (62) in the hydraulic accumulator (60) may also be adjustable. This could be pre-selectable or controlled by means of driving parameters. For example, in this way it is possible to alter the resiliency of the gas cushion (62) as a function of the load or speed.

Figure 2:
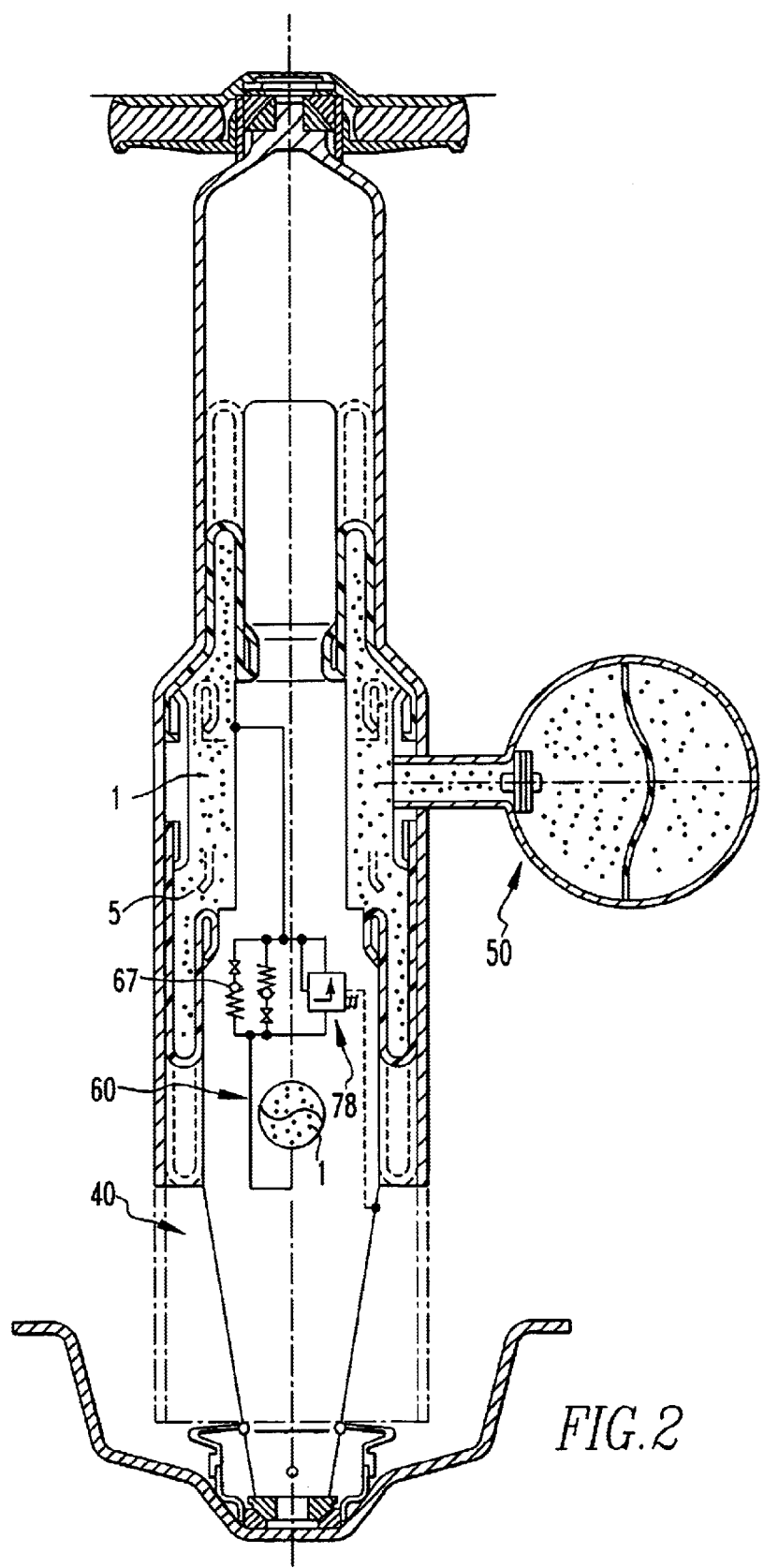
FIG. 2 shows a spring damping system having one external and one internal hydraulic accumulator.

FIG. 2 shows a hydraulic accumulator (60) arranged within the guide piston (40). Here, for example, the throttle passage (67) and the differential pressure-controlled valve (70) are connected in parallel with each other. In this embodiment, also the pressure in the bellows space (5) is compared with the atmospheric pressure, and the differential-pressure-controlled valve (70) is opened when a pre-set pressure difference is exceeded.

The arrangements according to FIGS. 1 and 2 can also be used to avoid damage to the tubular bellows in the event of an overpressure, such as occurs when the suspension for one wheel is compressed quickly. To this end the pressure balance (70) is designed, for example, in such a way that it opens when the pressure on the bellows space (5) exceeds a pre-set threshold value in comparison with the atmospheric pressure.

A combined solution is also conceivable, in order to avoid both an under-pressure and an over-pressure in the bellows space (5).

In that case, the pressure balance (70) has, for example, three pistons, two of which are sealing pistons (76). The middle piston is then a control piston (72), which has control edges at both of its end faces. In this way two separate chambers are formed in the cylinder (71), these chambers being separated by the control piston (72). By means of one of these chambers the hydraulic accumulator (60) is then connected to the bellows space (5) if the pressure in the bellows space (5) is too low. The other chamber then connects the bellows space (5) to the hydraulic accumulator (60) if the pressure in the former is too high. The two flow directions can, if appropriate, be protected against each other by means of one-way valves.

What is claimed is:

1. A combined spring and shock absorber system for wheel suspensions employing a tubular rolling bellows arranged between a wheel-support structure and a vehicle-body-end attachment, said bellows enclosing a space (5) filled with an incompressible fluid, a first hydraulic accumulator (50) in communication with said bellows space (5), and at least one addtional hydraulic accumulator (60) in communication with said bellows space (5) via a throttle passage (67) and via at least one pre-set differential-pressure-control valve (70), said differential-pressure-control valve (70) being in communication with said bellows space (5) so as to open when the pressure in the bellows space (5) drops below a pre-set threshold value.

2. A system according to claim 1, wherein the differential-pressure-control valve (70) provides for communication with the bellows space (5) as a function of the pressure differential between the bellows space (5) and an ambient atmosphere.

3. A system according to claim 1, wherein said additional hydraulic accumulator (60) is a cylindrical tubular reservoir.

4. A system according to claim 1, wherein the differential-pressure-control valve (70) is a pressure balance structure.

5. A system according to claim 3, wherein said throttle passage (67) is arranged at one end and said differential-pressure-control valve (70) is arranged at the other end of the additional hydraulic accumulator (60).

6. A system according to claim 3, wherein the additional hydraulic accumulator (60) includes a fluid space (65) which is surrounded by a gas cushion (62).

* * * * *